Dec. 17, 1968  S. A. McCLUSKY  3,416,619
MEANS AND METHOD FOR RAPIDLY FILLING RECEPTACLES
Filed Feb. 7, 1966  5 Sheets-Sheet 1

INVENTOR.
STANLEY A. McCLUSKY
BY
Miketta, Glenny, Poms & Smith
ATTORNEYS.

Dec. 17, 1968　　　　S. A. McCLUSKY　　　　3,416,619
MEANS AND METHOD FOR RAPIDLY FILLING RECEPTACLES
Filed Feb. 7, 1966　　　　　　　　　　　　　　5 Sheets-Sheet 2
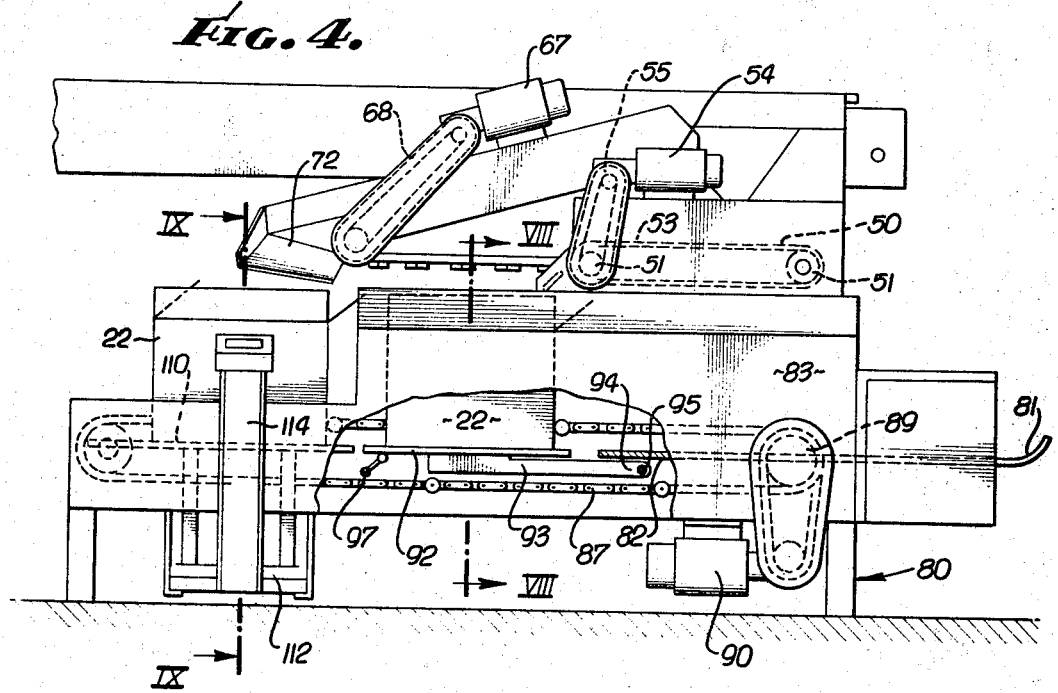
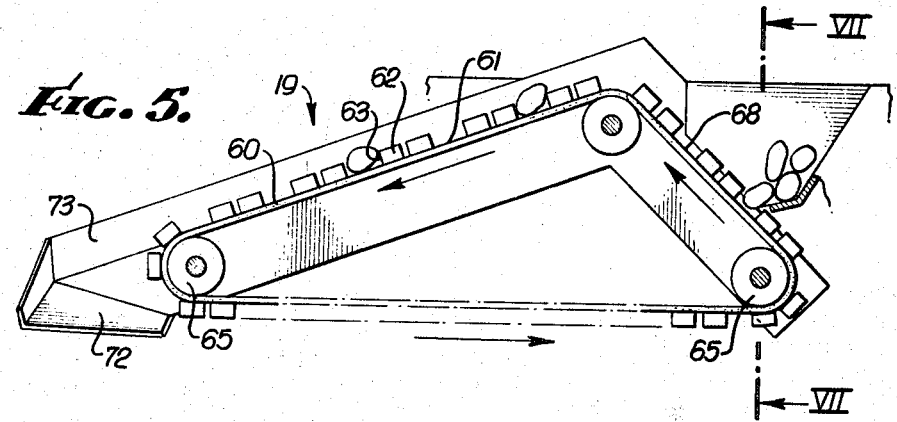
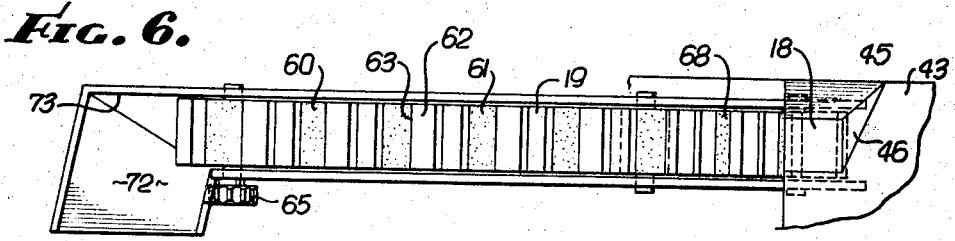
INVENTOR.
STANLEY A. McCLUSKY
By Miketta, Glenny, Pons & Smith
ATTORNEYS.

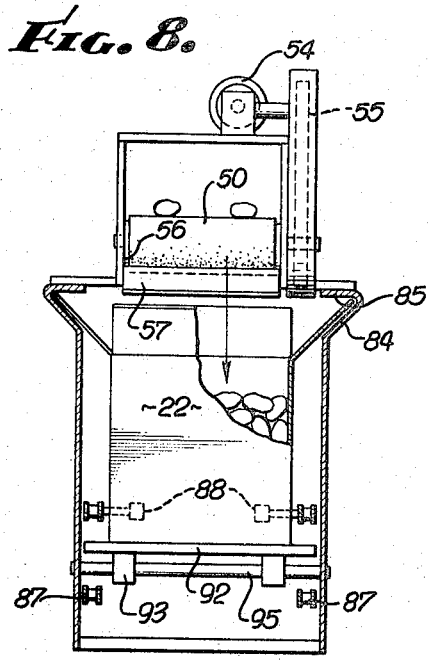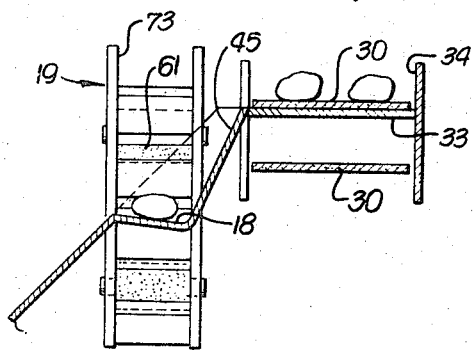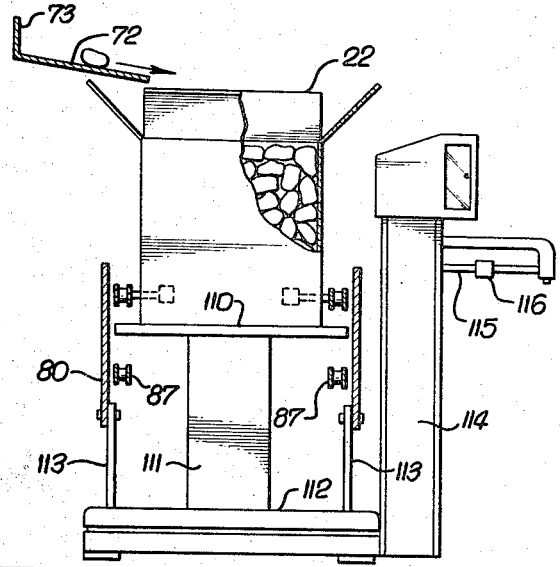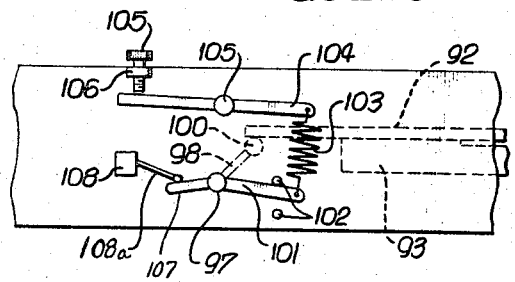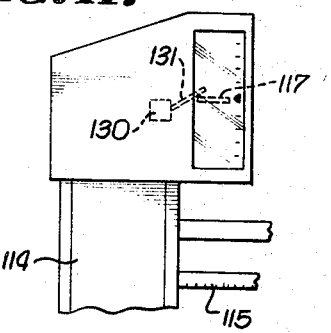

Dec. 17, 1968  S. A. McCLUSKY  3,416,619
MEANS AND METHOD FOR RAPIDLY FILLING RECEPTACLES
Filed Feb. 7, 1966  5 Sheets-Sheet 4
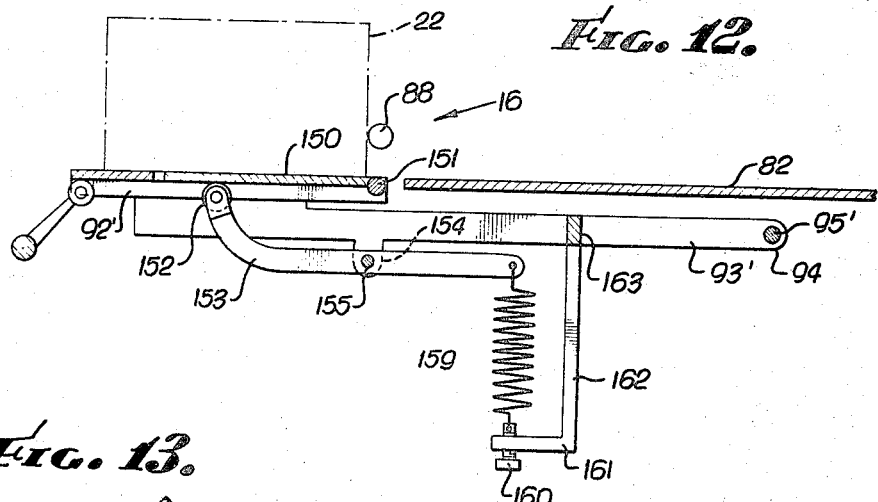
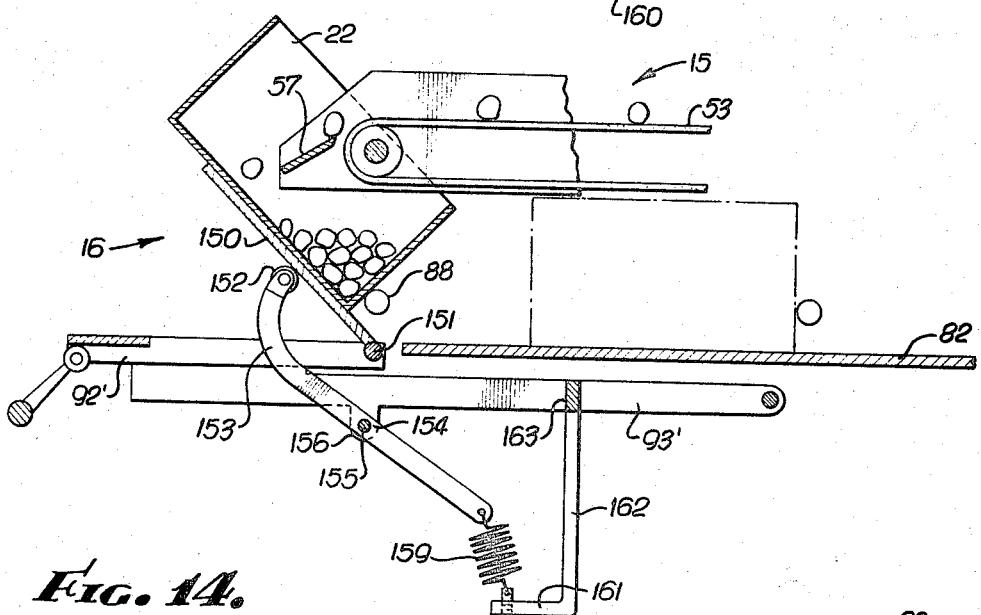
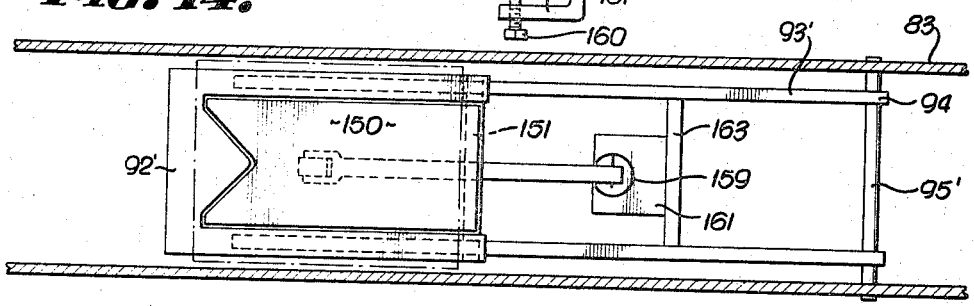
INVENTOR.
STANLEY A. McCLUSKY
By
Miketta, Glenny, Poms & Smith
ATTORNEYS.

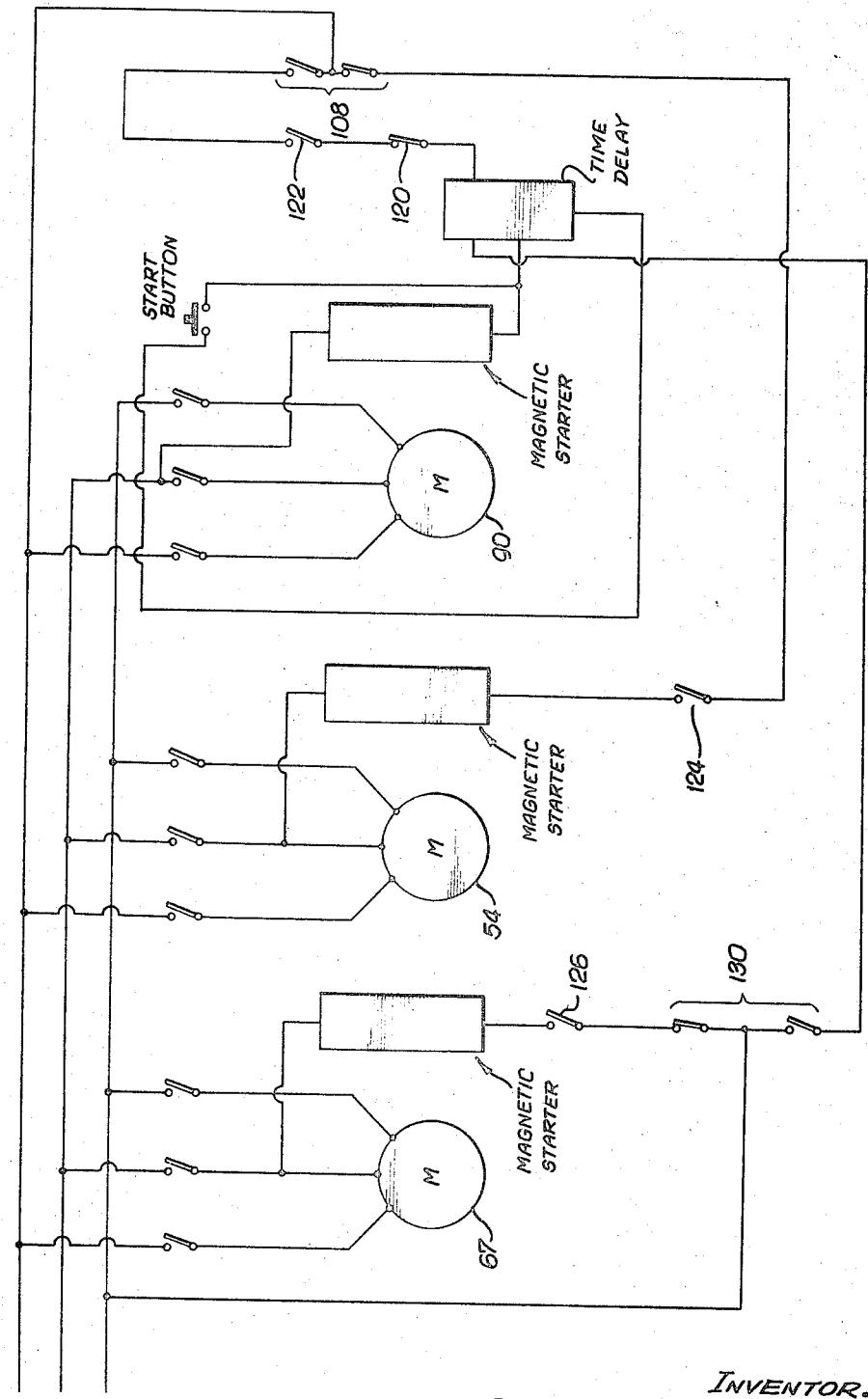

United States Patent Office 3,416,619
Patented Dec. 17, 1968

3,416,619
MEANS AND METHOD FOR RAPIDLY
FILLING RECEPTACLES
Stanley A. McClusky, 3001 Baylor Ave.,
Bakersfield, Calif. 93305
Filed Feb. 7, 1966, Ser. No. 525,671
12 Claims. (Cl. 177—53)

ABSTRACT OF THE DISCLOSURE

A machine for filling receptacles with articles to a precise predetermined weight by providing two filling and weighing stations, the first of which is a bulk filling station at which the receptacle is filled with articles to an underweight condition and is then moved to a second weighing station wherein the receptacle is filled to a final predetermined weight condition by successively feeding discrete articles to the receptacle.

---

This invention relates to a machine for filling receptacles with articles to a precise accurate predetermined weight and more particularly is related to a two-stage filling and weighing machine in which a receptacle is first filled by bulk feeding methods to a predetermined underweight condition and is then filled to a predetermined final weight condition by successively feeding discrete articles to said receptacle.

The present invention relates particularly to the filling and weighing of receptacles with produce such as potatoes. Potatoes are generally sold by weight and may be packaged in boxes such as cardboard cartons, burlap sacks, or bags of different size and material. Other produce sold by weight may include tomatoes, brussel sprouts, pears, zuccini squash, cucumbers, plums and the like. The concept of the present machine is readily adapted to fill various open-mouthed containers or receptacles such as cardboard boxes, burlap bags, paper or plastic bags, the filling and weighing operation being performed at two adjacent stations with an empty box to be filled at a first station and a substantially filled but underweight box at a second station.

Generally speaking, an exemplary machine of the present invention is adapted to be located adjacent a supply source of potatoes which preferably have been or are being sized by well-known sizing apparatus. In a typical installation a machine is located opposite each sizing classification used for potatoes. Potatoes discharged from the sizing apparatus are conveyed away from the sizing apparatus by a continuously moving transport belt means. Such a machine may be installed alongside and parallel to the transport belt and potatoes transported therealong are laterally diverted at a selected point onto a collection or feed zone of the present machine. A continuous supply of potatoes is provided at the feed zone from which a first article conveyor means moves potatoes in bulk toward a first filling and weighing station. To reach the first article conveyor means, potatoes are moved from the transport belt across the feed end of a second article conveyor means which advances potatoes of selected aggregate size or weight in a separate discrete manner to a second filling and weighing station. In operation of the machine of the present invention an empty box is located at the first station and a pre-filled box is located at the second filling station, the pre-filled box having slightly less weight than the final predetermined weight for a box of potatoes. Both boxes are fed simultaneously from both article conveyor means, the box at the first station receiving its potatoes in bulk for rapid filling, and the box at the second station receiving potatoes individually and discretely to just bring the pre-filled box to selected weight. When both boxes have been filled to their separate different predetermined weights, which preferably occurs at the same moment, the box conveyor means on which they are supported is actuated to simultaneously advance the boxes, the lead box from the box conveyor for storage or other distribution and the following box to the second filling station.

The machine of the present invention contemplates a very compact arrangement of article transport means, first article conveyor means, and a second article conveyor or dribble means. The invention also contemplates means for rapid, virtually foolproof automatic operation of the machine.

Prior proposed filling and weighing machines have included a two-stage operation and have included the use of dribble conveyors at a second station (see Patent 2,746,707). However such prior proposed weighing machines included several disadvantages and difficulties in operation. Some of these were the lack of or difficulty in maintaining an adequate supply or feed for the dribble conveyor. Another was the difficulty of control of discharge of the dribble conveyor, such prior proposed machines using gates and the like. Moreover, prior proposed two-stage weighing and filling machines were relatively slow in operation, occupied large floor area, and often the weighing stations were spaced apart more than a box length.

It is therefore the primary object of this invention to disclose and provide a machine for weighing and filling boxes with articles to a pre-determined weight in a rapid effective foolproof manner.

An object of the invention is to disclose and provide a novel machine wherein articles are continuously transported to the machine and the machine is constructed and arranged to receive and rapidly handle such articles so as to provide a rapid weighing and filling operation.

Another object of the invention is to disclose and provide a machine wherein a box conveyor means is intermittently actuated only upon the attainment of predetermined weight conditions at two box filling stations and wherein article conveyor means for supplying articles to the stations are each independently operable.

A still further object of the invention is to disclose and provide a machine for weighing and filling boxes wherein a second article or dribble conveyor means includes means for separating and orienting discrete articles and moving said discrete separated articles to the second box filling station for discharge thereto in an amount sufficient to virtually only bring said second box to final weight.

Another object of this invention is to disclose and provide a means for introducing fruit or produce into a box in a manner which will minimize bruises, abrasions, or other damage usually caused by rapid filling of a box and by dropping such articles box height. The invention contemplates means for inclining or tilting a box toward the end of a feed conveyor so that such conveyor end is partially enclosed by the box and the height of fall of articles therefrom is considerably reduced. The invention further contemplates that such box tilting means be supported by the weighing means.

These and many other objectives and advantages of this invention are readily apparent from the following description of the drawings in which an exemplary embodiment of this invention is shown.

FIG. 4 is a side elevational view of FIG. 1 taken in the plane indicated by line IV—IV of FIG. 1 and with a side wall broken away in part.

FIG. 5 is a sectional view taken in the vertical plane indicated by line V—V of FIG. 1.

FIG. 6 is an enlarged top plan view of the dribble conveyor shown in FIG. 1.

FIG. 7 is a transverse sectional view taken in the plane indicated by line VII—VII of FIG. 5.

FIG. 8 is a fragmentary transverse sectional view taken in the plane indicated by line VIII—VIII of FIG. 4.

FIG. 9 is a transverse fragmentary sectional view taken in the plane indicated by line IX—IX of FIG. 4.

FIG. 10 is an enlarged fragmentary side elevational view of the weight control means at the first weighing station.

FIG. 11 is an enlarged fragmentary top view showing the switch means for controlling the weighing at the second station.

FIG. 12 is an enlarged fragmentary vertical sectional view showing a modification of the weighing means at the first station permitting tilting of a box.

FIG. 13 is an enlarged fragmentary sectional view of the modification shown in FIG. 12 with the box in tilted position.

FIG. 14 is a top view of FIG. 12 with plate 82 removed.

FIG. 15 is a schematic circuit diagram showing the filling and weighing control means for the several conveyors.

Figure 1:
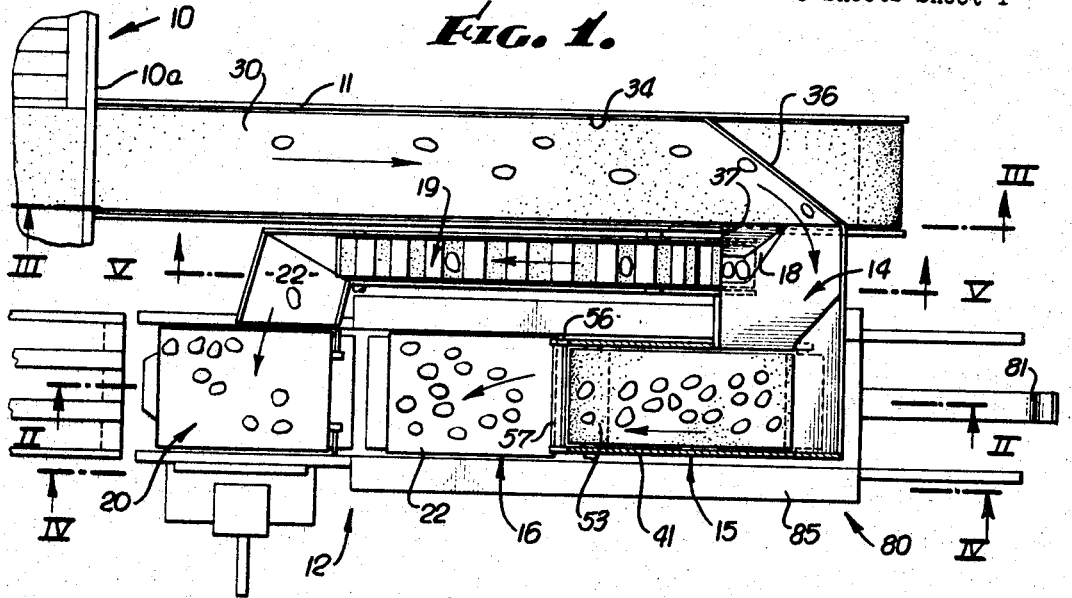
FIG. 1 is a top schematic view of a machine embodying the present invention, the machine being partly in section and being shown associated with a transport conveyor and a discharge conveyor.
Figure 2:
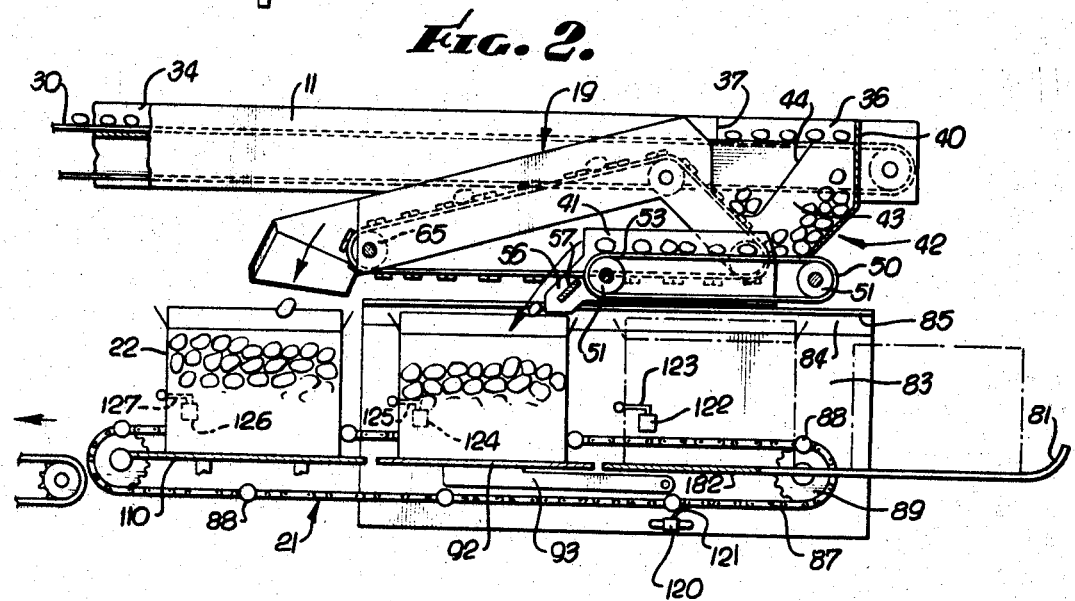
FIG. 2 is a sectional view taken in a vertical plane indicated by line II—II of FIG. 1.
Figure 3:
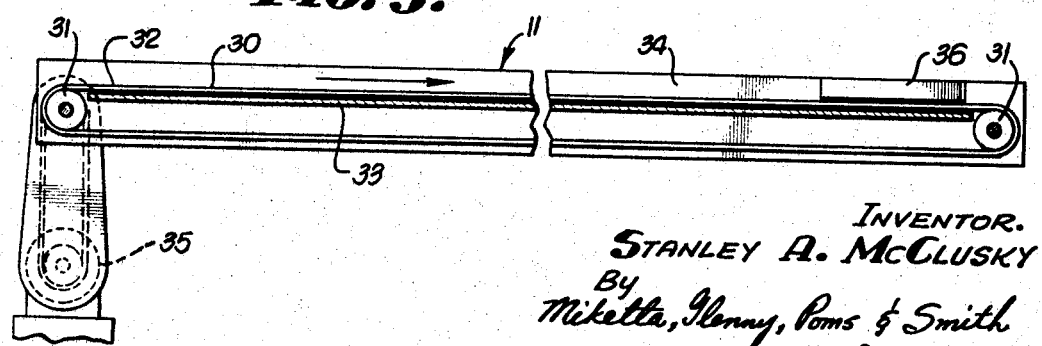
FIG. 3 is a sectional view taken in a vertical plane indicated by line III—III of FIG. 1.

FIG. 1 schematically shows an exemplary article or potato packaging operation which includes a filling and weighing maching 12 embodying this invention. In general, articles of produce such as potatoes, fruit of various kinds, and the like may be classified according to size or volume by well-known sizing apparatus 10 having a plurality of selected sizing classifications. At each sizing classification, such as 10a, potatoes (the article used for this example) may be moved directly or by suitable intermediate conveyors onto a continuously moving transport means 11 which rapidly moves the potatoes in a stream in bulk fashion away from sizing apparatus 10. At a selected point along transport means 11, the stream of potatoes is laterally diverted and fed onto a box filling and weighing machine 12 embodying this invention. In this example, the stream of potatoes is directed into the collection zone 14 at one end of machine 12 where a major portion of the potatoes are accumulated and then fed to a first article conveyor means 15 to move, in quantity and rapidly, potatoes to a first weighing and filling station 16. Collection zone 14 also includes and accumulates a small portion of potatoes at a relatively small pocket-like section 18 which is provided at the infeed end of a second article or dribble conveyor means 19 for conveying potatoes in discrete, separate fashion to a second weighing and filling station 20. A box conveyor means 21 successively supplies opened boxes 22 to the first and second filling stations in a manner described hereafter. At the first weighing station 16, each box is almost completely filled. At the second weighing station 20, individual potatoes are discharged into box 22 until a selected precise weight is obtained. Means are provided for stopping box conveyor means 21 so that boxes 22 will be held at filling stations 16 and 20 until the selected weight condition at each station is satisfied. Means are provided when the weight condition at each station is satisfied for simultaneously advancing the boxes from their respective stations; the filled and precisely weighed box at the second station being advanced to a discharge conveyor which transports the box to a selected destination.

In detail, means for feeding potatoes to transport means 11 may include a well known supply conveyor or other means for moving and distributing sized or unsized potatoes from a supply source to the transport means 11. In this example, the transport means 11 may comprise a continuously moving endless belt 30 mounted on spaced sprocket means 31 and having its feed end 32 disposed beneath the supply conveyor means. The top lay of endless belt 30 may be supported by an underlying horizontal plate 33 and upright side walls 34 are provided to contain the potatoes on belt 30 during movement thereof. Transport means 11 may be driven in well known manner by motor means 35 connected by a drive chain to one of the sprocket means 31. Adajcent the end of transport means 11, distal from the supply source conveyor, a diagonally disposed diverter member 36 crosses the belt 30 to direct moving potatoes to one side and off the endless belt 30. Side wall 34 opposite diverter member 36 is provided with a side wall opening 37 of suitable width through which potatoes move into potato collection zone 14 of machine 12.

Machine 12 embodying this invention may be disposed longitudinally alongside transport means 11 with its feed end or collection zone 14 opposite opening 37. It will be understood, of course, that potatoes may be directed along a path to zone 14 from other directions by suitably locating the transport or conveyor means. Collection zone 14 may comprise a bottom wall means 42 having a bottom wall section 43 inclined downwardly from belt 30 to the proximate side of conveyor 15 and may slope forwardly at the receiving end of conveyor end 15 so that potatoes moving off belt 30 and down the bottom wall section 43 will continually feed in bulk quantities the adjacent end of conveyor 15. Transverse end wall 40, at the end of the collection zone and longitudinal side walls 41 extending along conveyor 15 contain the potatoes on the conveyor 15.

Adjacent and forwardly of wall section 43 and between conveyor 15 and belt 30, the bottom wall means 42 may include a depressed configured bottom wall section 44 which may have generally triangular inclined portions 45 and 46, forming a small pocket-like section 18 at the bottom feed end of dribble conveyor 19. Thus, potatoes, diverted through side wall opening 37, move into collection zone 14 to feed both conveyor 15 and dribble conveyor 19. In such movement into the collection zone, the main stream of potatoes crosses to conveyor 15, but the bottom wall means is so shaped that the pocket 18 at the bottom of the dribble conveyor continuously draws and collects a small quantity of potatoes from the main potato stream.

The first article conveyor means 15 comprises an intermittently movable conveyor endless belt 50 supported on spaced end sprocket means 51 in well-known manner. The top lay of belt 50 receives potatoes from the collection zone 14. The conveyor means 15 may be of any selected suitable length and includes the longitudinal side walls 41. Above the discharge end 53 of conveyor 15 may be supported motor means 54 connected by chain means 55 to sprocket means 51 at the conveyor discharge end for driving said conveyor 15. At the discharge end of the conveyor, side walls 41 are provided with forwardly and slightly downwardly extending wall extensions 56 supporting a downwardly inclined transverse apron member 57 for directing potatoes from the top lay of belt 50 into an open box 22 positioned therebeneath. The speed of conveyor means 15 is relatively fast so that box 22 may be rapidly filled to an underweight condition, for example, short about five potatoes.

The second article or dribble conveyor means 19 may include a conveyor belt 60 including a belt strip 61 carrying on its surface a plurality of transversely arranged blocks or spacers 62 defining therebetween pockets 63 for receiving and holding a potato of selected size or volume. The pocket 63 is normally only sufficiently large enough so as to pick up one potato from the collection zone 14. The spacers 62 may be adjustably located on belt 61 so as to vary the size of pocket 63. It is contemplated that when there is wide variation in the sizing of potatoes, as for example when potatoes are being packaged without regard to size classification, pocket 63 may accommodate two small size potatoes which would be the equivalent of the average size or volume of the average size classification of potatoes being packaged. Thus, the weight of the discrete potato or potatoes carried by each pocket 63 may be predetermined so that a selected weight of potato may be added to a box 22 at the second weighing and filling station.

Dribble conveyor means 19 also includes a drive sprocket means 65 at one end thereof and idle rolls 66. Sprocket means 65 may be driven by motor means 67 mounted above and to one side of dribble conveyor 19 and connected to sprocket means 65 by a suitable chain drive 68. Conveyor means 19 may be driven relatively slow so that during the time the box at the first station is filled, the necessary number of potatoes, for example, five, will be fed to the box at the second sation. Preferably and for speed of operation both boxes complete filling at about the same time.

The top lay of conveyor belt 60 follows an inclined path which rises steeply at a feed and orienting section 68 at which a potato is received in pocket 63 from the pocket-like section 18 in collection zone 14. In movement of potatoes up the inclined orienting section 68, any excess or additional potatoes which may have been picked up by a spacer 62 and pocket 63, will be caused to fall back to the pocket-like section 18 of the collection zone 14. When a pocket 63 reaches the top of section 68, only one potato or two potatoes of selected approximate weight and size will remain in a pocket 63. The top lay of belt 60 then inclines downwardly as indicated by section 69 to the discharge end 70 where individual discrete potatoes fall upon a downwardly and sidewardly inclined chute 72 from which the potatoes are discharged into open box 22 at the second filling and weighing station. Chute 72 is provided with upstanding peripheral walls 73 on two sides thereof in order to contain and direct the path of potatoes to the discharge edge of chute 72.

Box conveyor means 21 extends longitudinally beneath article conveyor means 15 and is intermittently actuated in order to successively advance and present open boxes 22 at the first and second weighing and filling stations 16 and 20. A machine frame means generally indicated at 80 of suitable frame members supports box conveyor means 21 and both article conveyor means 15 and 19. At the box feed end of conveyor means 21 a rearwardly extending horizontal tongue 81 with an upcurved end may be provided to facilitate assembly and closure of bottom flaps of a foldable collapsed box or carton as it is fed to the box conveyor means. A suitable stapling machine (not shown) may be provided adjacent one end of tongue 81 to secure the box bottom flaps in assembly. As a box 22 is introduced onto box conveyor means 21, it may be supported by a horizontal flat longitudinally extending plate 82 along which are provided side walls 83 extending through the first weighing station 16. Side walls 83 may have outwardly directed inclined upper longitudinal side wall portions 84 with horizontal inturned box flap holding sections 85 spaced thereabove so as to retain the top side flaps of a box 22 in open position.

Box conveyor means 21 includes a pair of parallel endless side chains 87 provided at longitudinal spaced intervals with inboardly mounted transversely aligned box engaging wheels or rollers 88. As each box 22 is introduced along plate 82, the box rear wall is contacted between top and bottom edges by rollers 88 and as chains 87 are intermittently advanced, boxes in spaced relation are positively intermittently advanced a selected distance along box conveyor means 21. Chain means 87 may be supported by spaced end sprockets 89 carried by frame means 80 and may be driven by motor means 90 in well known manner.

The first filling and weighing station 16, which is forwardly of and at the end of the main potato conveyor 15, includes a weighing platform 92 normally lying in the plane of plate 82. Platform 92 may be supported for limited vertical movement by rearwardly extending arms 93 fixed to the bottom of platform 92 and pivoted at their rear ends at 94 from a transverse shaft 95 mounted in frame side walls 83. Platform 92 is approximately the area of a bottom of a box 22 to be used in packaging the product.

Means for biasing platform 92 upwardly to empty box receiving position and to permit downward movement of the platform to a selected box short or underweight loaded position may comprise a shaft 97 pivotally mounted in side walls 83 below the front edge portion of the platform 92 and a crank arm 98 fixed to said shaft 97 and carrying a roller 100 in engagement with platform 92. One end of shaft 97 extends outwardly from the side wall 83 and carries a rearwardly extending arm 101 limited in its movement between vertically spaced pins 102 on side wall 83. A biasing spring 103 has one end connected to arm 101 and its other end connected to an adjustment bar 104 pivotally mounted at 105 intermediate its end on wall 83. The opposite end of adjustment bar 104 is contacted by an adjustment screw 105 threaded in a lug 106 fixed to wall 83. Turning of the adjustment screw 105 varies the tension of spring 103 and thus regulates the deflection under load of platform 92. A switch actuating arm 107 extends forwardly from shaft 97 for actuating switch means 108 as later described.

The second filling and weighing station 20 may comprise a scale plate 110 elevated to just below the plane at the discharge level of platform 92. Scale plate 110 lies between conveyor chains 83 and may be supported by an upstanding support member 111 fixed at its lower end to base 112 of a well known beam type scale. Base 112 may be carried by frame means 80 above the floor by means of spaced parallel transverse angle section members 113 onto which base 112 may be slidably mounted from one side of the machine. Scale base 112 may carry an upstanding post or column 114 from which extends a balance beam 115 with a slidable weight 116 thereon which is positioned to a desired precise weight of a box of potatoes. An indicator arm 117 is pivotally mounted at one end from post 114 above the balance beam and its other end moves relative to plus and minus scale indicia in well-known manner. Thus when an underweight box is advanced from the first station to the second station the scale plate receives the underweight box and individual discrete potatoes are dropped into the box from dribble conveyor 19 to incrementally increase the aggregate weight of the box of potatoes until the desired preset scale weight is satisfied. The filled and weighed box is then moved by the box conveyor means 21 onto a suitable distribution conveyor for transport to a selected place.

Operation of machine 12 will be described in connection with an exemplary system of electrical switch means which serves to control the operation of the several conveyor means 15, 19 and 21 as well as weighing of boxes 22 at weighing and filling stations 16 and 20. Such system may include a switch means 120 carried by a frame side wall 83 adjacent the bottom lay of conveyor chain 87 and having a switch arm 121 which extends into the path of box engaging rollers 88 on the box conveyor 21 to precisely stop and position a box 22 on weighing platform 92. Switch means 120 may be mounted for longitudinal adjustment along side wall 83 in any suitable manner so that opening of switch means 120 (normally closed) will stop box conveyor 21 at the precise position desired.

A switch means 122 is also carried on side wall 83 adjacent the top lay of chain 87 and has a switch arm 123 extending into the path of boxes 22 before they reach the first station 16. Switch means 122 senses the presence of boxes on the conveyor means 21 advancing to first weighing station 16 so that conveyor means 21 will advance only if boxes are in successive adjacent order on conveyor 21. Switch means 122 may be normally open and when closed by a box in contact therewith and in proper position to be advanced to the first weighing station 16 will permit actuation of box conveyor means 21 as described later.

Switch means 124 (normally open) may also be carried on the side wall 83 and mounted adjacent the front or leading face of a box 22 positioned by conveyor means 21 on platform 92 at the first weighing station. Switch arm 125 extends into the path of the box and when closed thereby actuates and starts the main potato conveyor means 15.

Switch means 126 may be carried on side wall 83 adjacent the leading face of a box 22 positioned on scale plate 110 at the second station 20. Switch means 126 is normally open and when its switch arm 127 is moved to switch closed position by a box 22 on scale plate 110, the dribble conveyor means 19 is actuated.

Switch means 108 (two sets of contacts, one set normally closed, one set normally open) is actuated by lowering of platform 92 whose motion is transmitted through turnable shaft 97 to switch actuating arm 107 which engages switch arm 108a of switch means 108 and at a preselected weight opens the closed set of contacts of switch means 108 to stop the main potato conveyor means 15 and closes the open set of contacts to complete a circuit through switch means 122 and 120 to a time delay for delaying the next movement of the box conveyor means 21.

Switch means 130 (two sets of contacts, one set normally closed, one set normally open) may be carried by the scale post 114 adjacent to weight indicator 117 and has a switch arm 131 contacted by indicator 117 when a precise weight of potatoes is obtained at second weighing station 20. As such precise weight, the normally closed set of contacts of switch means 130 is opened and dribble conveyor 19 is stopped. Its normally open set of contacts are closed to complete a circuit to the time delay for box conveyor 21. Since dribble conveyor means 19 normally discharges only single potatoes to box 22 at second weighing station 20 and since the potatoes are relatively widely spaced apart on conveyor 19 only one potato (or its equivalent) at a time falls into box 22. If the selected weight is satisfied by that one potato, the dribble conveyor means 19 will be stopped before the succeeding potato will be discharged from its pocket onto chute 72.

When both boxes 22 at stations 16 and 20 have been independently and separately loaded to their preselected weights so that the normally closed sets of contacts of switch means 108 and 130 have been actuated to open position and the conveyors 15 and 19 have been stopped, and the normally open sets of contacts of switch means 108 and 130 have been closed, such condition at weighing stations 16 and 20 causes actuation of the box conveyor means 21 (if switch means 122 is closed by a box) through a time delay relay which energizes a coil in a magnetic starter for the box conveyor motor means 90 so that the box conveyor 21 will be actuated and the row of boxes thereon will be advanced to their next position. Switch means 120 when contacted by the next roller 88 opens the circuit to the motor means 90, and the coil in the starter is de-energized until again actuated by switch means 108, 130. Over travel of the conveyor 21 moves roller 88 just beyond switch means 120 so that it returns to normal closed position. The completely filled box 22 at station 20 will be discharged from box conveyor means 21 onto a suitable distribution conveyor for movement to a selected location.

When this occurs the underweight box then at station 16 will be advanced to station 20 and the cycle of operation of the box conveyor 21, feed conveyor means 15, and dribble conveyor means 19 will be repeated. The time delay assures that potatoes being fed from conveyor means 15 do not fall between boxes as the boxes are successively advanced from station to station. It should be noted that satisfaction of the weight requirement at either station 19 or 20 will not alone produce actuation of box conveyor means 21 and weight requirement must be satisfied at both stations 16 and 20. Since the box at the second station 20 may be filled to its precise weight prior to the filling of the preselected underweight of the box at the first station 16, and flow of potatoes from conveyor 15 may be the last to be stopped, such time delay assures that potatoes passing over the discharge member at the end of conveyor means 15 will fall into a box 22.

In operation of the machine above described, the transport conveyor means 11 continuously feeds a stream of potatoes to collection zone 14. Collection zone 14 accumulates a quantity of potatoes and thus maintains a supply source of potatoes for both the main feed conveyor 15 and the dribble conveyor 19. The particular configuration of the bottom wall of the collection zone 14 is important because such configuration assures a supply of potatoes at pocket 18 at the bottom of dribble conveyor 19. When pocket 18 has received and holds potatoes diverted from the main stream into the collection zone, any excess potatoes are swept by the main potato stream into that lower part of the collection zone to furnish an ample supply of poatoes necessary to rapidly fill to preselected underweight condition box 22 at the first weighing station 16. The rapidity with which machine 12 operates is examplified by its ability to precisely feed fifty pound (net) boxes of potatoes (80–110 potatoes per box) at the rate of from 600 to 1,000 boxes per hour.

It will be understood of course that machine 12 embodying this invention may be employed in the packaging of produce and articles other than potatoes. In another exemplary use of this machine involving packaging of fruit such as plums which must be carefully handled in order to avoid bruising, abrading, and other damage, it has been found desirable to modify the construction of the first weighing station 16 so that such fruit are gently lowered and yet rapidly packaged into a box 22. For this purpose the above described machine 12 may be readily modified so that a weighing platform 92′ may be supported by rearwardly extending arms 93′ fixed to the bottom of platform 92 and pivoted at their rear ends at 94 from a transverse shaft 95′ mounted in frame side walls 83. Platform 92′ includes a central platform section 150 pivotally mounted at 151 from the trailing transverse edge margin of platform 92 for upward movement relative thereto into an inclined position as indicated in FIG. 13. Platform section 150 may be fork-shaped as shown or other suitable shapes. A second platform member (not shown) may overlie and be pivoted to platform 92 if desired.

Platform section 150 is tiltable to an inclined plane of approximately 45° about its pivotal mounting at 151 by means including a roller 152 engaging the bottom surface of platform section 150 and carried by an upwardly bent or curved member 153 pivotally mounted between its ends at 154 from a transverse shaft 155 supported in depending brackets 156 carried on spaced platform arms 93′. Rearwardly of shaft 155, member 153 extends generally horizontal and has its rear end connected to the top end of a biasing spring 159 adjustably secured at its bottom end by an adjustable bolt 160 carried on a forwardly extending lug 161 on a depending bracket 162 fixedly secured at its upper end by a transverse member 163 to rearwardly extending arms 93′. It will thus be apparent that the structural means for tilting the platform 92′ is entirely supported from the weight support means for the platform 92′ and moves therewith in response to filling of the box. Spring 159 normally biases platform section 150 into its upwardly inclined position.

When using the modification of weighing station 16 as described above, an underweight substantially filled box 22 is supported on the weighing platform 92′ and is positioned as before by a box engaging roller 88. The underweight filled box 22 overcomes the biasing force of spring 159 so that the platform section 150 is horizontal and in the same plane as the remainder of platform 92′. As the box conveyor 21 advances the filled box from station 16, the box will slide forwardly onto the second station 20 in the manner previously described. As the box leaves platform 92' the succeeding empty box is advanced onto the platform section 150 while it is being retained in the plane of platforms 92' by the filled box 22. When the latter box clears the forward ends of section 150, the empty box has advanced over the major portion platform 92' and as rollers 88 further advance empty box 22 the platform section 150 is biased to its upwardly inclined position by the spring 159.

In such upwardly inclined position of platform section 150 the empty box 22 carried thereby partially encloses and receives therewithin the discharge end of conveyor means 15. The discharge board 57 may be only approximately six inches from the bottom of empty box 22. As filling conveyor 15 is actuated and plums are discharged into box 22, it will be apparent that the plums will drop only a short distance to the bottom of empty box 22 and then because of the inclination of the box will roll rearwardly. The rear portion of the box will be filled first. As the plums accumulate in the box, their weight will gradually and incrementally overcome the biasing force of spring 159 so that box 22 as it is being filled is slowly and steadily returned to its normal horizontal position on platform 92'. During such return it will be apparent that forward movement of the box relative to the conveyor means 15 will cause gradual withdrawing of the box from its partially enclosed relationship with the end of feed conveyor means 15. Thus during filling of box 22 on inclined section 150, the plums will fall only a slight distance. When the box returns to horizontal position the level of the plums in the box will be virtually uniform since the gradual decreasing inclination of the box tends to augment filling toward the front part of the box.

It should be noted that in inclined position the box is held only by the box engaging conveyor rollers 88. It should also be noted that while filling of the box in inclined position, increasing load or weight of plums fed thereto is transmitted to the platform engaging roller 100 as in prior embodiments since the box inclining means is supported from the pivotal mounting members of the platform 92'.

It will thus be understood that a machine 12 embodying this invention achieves its speed of operation by very rapid filling and weighing by conveyor 19 of a box to a first stage, underweight yet almost final weight condition and that during the elapsed filling time for the first stage, the box at the second station is filled to final weight by the automatic addition of the necessary number of potatoes from the dribble conveyor 19. The relative speeds of filling at the two stages or stations is adjusted so that completion of filling occurs at about the same time. Both boxes may then be simultaneously advanced. Such a method of operation allows little wasted time in the box filling operation.

While a rigid open top box has been used in the exemplary embodiment of the invention described above, the box conveyor 21 may be modified to convey and advance other open top containers or receptacles such as burlap sacks, bags of paper or plastic material. It is understood that when the term "box" is used in the claims, it is intended to mean any open top container or receptacle adapted to be filled with articles.

It will be understood that various modifications and changes may be made in the machine 12 and in the weighing means as described above and which will come within the spirit of this invention and all such changes and modifications coming within the scope of the appended claims are embraced thereby.

I claim:

1. In a machine for filling boxes with articles to a predetermined weight, the provision of:
    a box conveyor means for moving a plurality of boxes to be successively filled along a path and actuatable to stop said boxes at each of two filling and weighing stations;
    a first article conveyor means for conveying articles in bulk to a first one of said stations;
    a second article conveyor means including spaced means for conveying articles in predetermined discrete spaced relation to a second one of said stations;
    means for each of said article conveyor means for independent actuation in response to positioning of a box at its respective station by said box conveyor means to feed articles to the box;
    means for independently stopping each of said article conveyor means in accordance with the filling and weighing condition at respective stations to stop feeding articles to the box; and
    means for simultaneouuis movement and release of said boxes from said stations only after each box at the filling station is filled to its predetermined weight.

2. A machine as stated in claim 1 wherein the spaced means of said second article conveyor means includes spaced pockets of selected size for separating articles within a selected weight classification from a collection of said articles.

3. In a compact machine for rapidly filling boxes to a predetermined weight with articles continuously discharged from an article sizing apparatus the combination of:
    an article transport means adapted to receive articles from a sizing apparatus and to continuously move said articles in a path away therefrom;
    a pair of article conveyor means alongside said transport means adapted to move articles in paths parallel to and in the opposite direction to articles moved by said transport means;
    means at adjacent ends of said transport means and said conveyor means for diverting articles from said transport means to said conveyor means;
    a box conveyor means below one of said article conveyor means for advancing boxes to two filling and weighing stations and in the same direction as articles advanced by said article conveyor means;
    an article collection zone at the feed end of one of said article conveyor means;
    said last mentioned article conveyor means being provided with means for selecting and advancing in spaced relation discrete articles from said collection zone;
    each of said article conveyor means being independently actuatable;
    said box conveyor means including means for stopping said boxes at said stations; and
    said stations and said pair of article conveyor means including means whereby said box conveyor means will be actuated only when each box at each station has been filled to a predetermined weight.

4. A machine as stated in claim 3 wherein one of said article conveyor means feeds articles in bulk random fashion to a box at one of said filling stations to a predetermined weight less than a final predetermined weight; and
    wherein the other article conveyor means feeds discrete articles advanced thereon in spaced relation to a box at the other filling station to its final predetermined weight.

5. In a weighing means for use in a box filling and weighing station to which articles are fed from a conveyor discharge end for filling a box positioned at said station, the combination of:
    a vertically movable weighing platform at said station;
    an elongated platform support member having one end connected to said platform,
    extending generally horizontally therebeyond in one direction,
    and mounted for pivotal movement about an axis remote from said platform;
    and means biasing said platform to a box receiving position and sensing the weight of the box as it is filled.

6. In a weighing means as stated in claim 5 including:
box tilting means pivotally mounted on said weighing platform to move toward said conveyor discharge end and to partially enclose said end with a box;
and means supported by said platform support member for biasing said box tilting means into tilted position.

7. In a machine for filling receptacles with articles to a precise predetermined weight, the provision of:
a receptacle conveyor means for moving a plurality of receptacles to be successively filled along a path;
means for stopping said receptacles at each of two filling and weighing stations;
a first article conveyor means for conveying articles in bulk to a first one of said stations;
a second article conveyor means including means for spacing and conveying articles in discrete predetermined spaced relation to a second one of said stations;
means at each of said stations independently actuatable for starting the respective conveyor means in response to engagement with a receptacle positioned at said station to commence feeding articles to the receptacles;
means at each filling and weighing station for independently stopping the respective article conveyor means and the feeding of articles in accordance with the weight condition of the receptacle being filled; and
means to actuate said receptacle conveyor means to move said receptacles from said stations only after each receptacle at each station is filled to its predetermined weight.

8. In a machine for filling boxes with articles to a predetermined weight, the provision of:
a box conveyor means for moving a plurality of boxes to be successively filled along a path and actuatable to stop said boxes at each of two filling and weighing stations;
a first article conveyor means for conveying articles in bulk to a first one of said stations;
a second article conveyor means for conveying articles in discrete separate fashion to a second one of said stations;
both of said article conveyor means being independently actuatable;
means for independently stopping each of said article conveyor means in accordance with the filling and weighing condition at respective stations; and
means for simultaneous movement and release of said boxes from said stations only after each box at the filling stations is filled to its predetermined weight;
said second article conveyor means having a feed end upstream from said first article conveyor means;
said second article conveyor means having pocket means for moving in discrete spaced relation one or more articles having an aggregate weight within a predetermined weight range related to article size.

9. In a machine for filling boxes with articles to a predetermined weight, the provision of:
a box conveyor means for moving a plurality of boxes to be successively filled along a path and actuatable to stop said boxes at each of two filling and weighing stations;
a first article conveyor means for conveying articles in bulk to a first one of said stations;
a second article conveyor means for conveying articles in discrete spaced relation to a second one of said stations;
means for each of said article conveyor means for independent actuation in response to positioning of a box at its respective station by said box conveyor means;
means for independently stopping each of said article conveyor means in accordance with the filling and weighing condition at respective stations;
means for simultaneous movement and release of said boxes from said stations only after each box at the filling station is filled to its predetermined weight;
said means for independently stopping said article conveyor means including
means at the first station to stop movement of the first article conveyor means;
means at the second station to stop movement of the second article conveyor means; and
means operative upon stopping of both article conveyor means by said stop means to actuate said box conveyor means for advancing boxes successively to said stations.

10. In a machine for filling boxes with articles to a predetermined weight, the provision of:
a box conveyor means for moving a plurality of boxes to be successively filled along a path and actuatable to stop said boxes at each of two filling and weighing stations;
a first article conveyor means for conveying articles in bulk to a first one of said stations;
a second article conveyor means for conveying articles in discrete spaced relation to a second one of said stations;
means for each of said article conveyor means for independent actuation in response to positioning of a box at its respective station by said box conveyor means;
means for independently stopping each of said article conveyor means in accordance with the filling and weighing condition at respective stations;
means for simultaneous movement and release of said boxes from said stations only after each box at the filling station is filled to its predetermined weight; and
means for reducing the height of fall of articles at the first station into a box at said station.

11. In a machine for filling boxes with articles to a predetermined weight, the provision of:
a box conveyor means for moving a plurality of boxes to be successively filled along a path and actuatable to stop said boxes at each of two filling and weighing stations;
a first article conveyor means for conveying articles in bulk to a first one of said stations;
a second article conveyor means for conveying articles in discrete spaced relation to a second one of said stations;
means for each of said article conveyor means for independent actuation in response to positioning of a box at its respective station by said box conveyor means;
means for independently stopping each of said article conveyor means in accordance with the filling and weighing condition at respective stations;
means for simultaneous movement and release of said boxes from said stations only after each box at the filling station is filled to its predetermined weight; and
means mounted in the path of said box conveyor means for stopping said box conveyor means when boxes are positioned at each weighing station means.

12. In a machine for filling boxes with articles to a predetermined weight, the provision of:
a box conveyor means for moving a plurality of boxes to be successively filled along a path and actuatable to stop said boxes at each of two filling and weighing stations;
a first article conveyor means for conveying articles in bulk to a first one of said stations;
a second article conveyor means for conveying articles in discrete spaced relation to a second one of said stations;
means for each of said article conveyor means for independent actuation in response to positioning of a box at its respective station by said box conveyor means;

means for independently stopping each of said article conveyor means in accordance with the filling and weighing condition at respective stations;

means for simultaneous movement and release of said boxes from said stations only after each box at the filling station is filled to its predetermined weight; and means mounted forwardly of said weighing stations in the path of boxes moving toward said weighing stations for rendering said box conveyor means inoperative in the absence of successive adjacent boxes on said box conveyor means.

References Cited

UNITED STATES PATENTS

| | | | |
|---|---|---|---|
| 3,073,399 | 1/1963 | Durand | 177—53 |
| 3,229,444 | 1/1966 | Rouse | 53—248 |

RICHARD B. WILKINSON, *Primary Examiner.*

G. H. MILLER, JR., *Assistant Examiner.*

U.S. Cl. X.R.

177—123; 53—55, 248; 198—39